United States Patent
Chang et al.

(10) Patent No.: US 7,046,840 B2
(45) Date of Patent: May 16, 2006

(54) 3-D RECONSTRUCTION ENGINE

(75) Inventors: Chu-Fei Chang, Union City, CA (US); Yiqing Jin, Hangzhou (CN); Jie Sun, Fremont, CA (US); Xing Fan, Chongqing (CN); Donghui Wu, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 683 days.

(21) Appl. No.: 10/010,963

(22) Filed: Nov. 9, 2001

(65) Prior Publication Data

US 2003/0091227 A1    May 15, 2003

(51) Int. Cl.
    *G06K 9/00*    (2006.01)
(52) U.S. Cl. .............. 382/154; 382/285; 382/293; 382/164; 345/420; 345/427
(58) Field of Classification Search ........... 382/154, 382/285, 103, 106, 293, 164, 165, 171, 199; 345/419, 420, 427; 348/42, 47, 48
    See application file for complete search history.

(56) References Cited

U.S. PATENT DOCUMENTS

| | | | |
|---|---|---|---|
| 5,867,590 A * | 2/1999 | Eylon ................... | 382/151 |
| 6,084,979 A * | 7/2000 | Kanade et al. ......... | 382/154 |
| 6,668,082 B1 * | 12/2003 | Davison et al. ........ | 382/190 |
| 6,781,618 B1 * | 8/2004 | Beardsley .............. | 348/43 |

OTHER PUBLICATIONS

Beardsley, Paul et al., "3D Model Acquisition from Extended Image Sequences," European Conference on Computer Vision, pp. II:683-695 (1996).

Hoppe, Hugues et al., "Surface Reconstruction from Unorganized Points," PhD Thesis, University of Washington (1994).

Koch, Reinhard et al., "Realistic Surface Reconstruction of 3D Scanes from Uncalibrated Image Sequences," Journal Visualization and Computer Animation, vol. 11, pp. 115-127 (2000).

Niem, Wolfgang and Wingbermühle, Jochen, "Automatic Reconstruction of 3D Objects Using a Mobile Monoscopic Camera," IEEE Proceedings of the International Conference on Recent Advances in 3-D Digital Imaging and Modeling, pp. 173-180 (Mar. 1997).

(Continued)

*Primary Examiner*—Bhavesh M. Mehta
*Assistant Examiner*—John Strege
(74) *Attorney, Agent, or Firm*—David T. Millers

(57) ABSTRACT

Systems and methods for generating three-dimensional models of an object use images having unmeasured camera parameters. Camera calibration determines the perspective of the camera from the content of the images. A background having a pattern with a known marks in each image can facilitate determination of the camera parameters. One background pattern includes separated marks having rectangular sections where corners of the rectangular sections provide calibrations points for the camera parameters. The camera parameters can also be determined by matching features of the object in different images and determining differences in perspective from differences in the appearance of the matched features in different images. A combination of projective and metric reconstructions provides robust reconstruction.

4 Claims, 7 Drawing Sheets

OTHER PUBLICATIONS

Niem, Wolfgang and Broszio, Hellward, "Mapping Texture From Multiple Camera Views Onto 3D-Object Models For Computer Animation," Proceedings of the International Workshop on Stereoscopic and Three Dimensional Imaging, Santorini, Greece (1995).

Pollefeys, Marc et al., "Self-Calibration and Metric Reconstruction in Spite of Varying and Unknown Intrinsic Camera Parameters," *International Journal of Computer Vision*, Kluwer Academic Publishers, Boston, pp. 1-18 (1998).

Pollefeys, Marc et al., "Automated Reconstruction of 3D Scenes From Sequences of Images," Isprs Journal of Photogrammetry And Remote Sensing, 55:4 pp. 251-267 (2000).

Pollefeys, Marc and Van Gool, Luc, "Stratified Self-calibration With the Modulus Constraint," IEEE Transactions on Pattern Analysis and Machine Intelligence, vol. 21, No. 8, pp. 707-724 (1999).

Schroeder, Will et al., *The Visualization Toolkit*, 2$^{nd}$ edition, Prentice Hall, pp. 146-152 (1998).

* cited by examiner

3-D RECONSTRUCTION ENGINE

REFERENCE TO COMPUTER PROGRAM LISTING

This patent document includes a computer program listing appendix that was submitted on a compact disc containing the following files: BasicDef.h (2 KB); Camera.cpp (11 KB); Camera.h (4 KB); Segment.cpp (258 KB); Segment.h (9 KB); TexImage.cpp (8 KB); TexImage.h (2 KB); TexMap.cpp (11 KB); TexMap.h (2 KB); TexMesh.cpp (43 KB); TexMesh.h (7 KB); tmLine2.ccp (12 KB); tmLine2.h (2 KB); tmTri3Area.ccp (23 KB); tmTri3Area.h (4 KB); tmTriangle2.ccp (9 KB); tmTriangle2.h (2 KB); VolumeWP.cpp (27 KB); and VolumeWP.h (3 KB), all create on Nov. 9, 2001. The material on the compact disc is hereby incorporated by reference herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Three-dimensional visual representations and panoramic views of objects have become increasingly important and useful in entertainment, commerce, and education. In movies and animation, for example, panoramic views can add interesting special effects such as rotation about stop-action scenes. In games and virtual reality applications, three-dimensional representations of objects permit changes in the views of the objects according to the virtual movement of a user. In electronic commerce, a web site can use three-dimensional representations of merchandise to allow a costumer to view the merchandise from any desired perspective. Three-dimensional representations of works of art, exhibits, and antiques can be similarly viewed for commercial or educational purposes, and three-dimensional or panoramic views of objects can aid scientists and engineers during research and development of new technologies or products.

One technique for creating a panoramic view of an object is sometimes referred to as 2.5-dimensional modeling. A 2.5-dimensional model of an object generally includes as series of images of the object from different perspectives. Taking these images generally requires a precision arrangement of cameras that photograph the object from the required perspectives. If enough images are used, the images can be shown in sequence to provide smooth apparent movement of a camera around the object. The 2.5-dimensional techniques have been effectively used, for example, in movies to allow a change in camera angle during stop action or slow motion filming. However, a 2.5-dimensional model of an object only provides specific views of the object and may be unable to provide some of the desired views of the object.

A full three dimensional model of an object describes the surface of the object in three dimensions and permits rendering of any desired views of the object. Reconstruction of a three dimensional model of an object has generally required several images of an object with each image having a known perspective (i.e., a known orientation and location of the camera relative to the object). The known orientations and locations of the cameras allow determination of projection matrices for the images. The projection matrices (or inverses of the projection matrices) allow determination of the three-dimensional coordinates of point, on the object from the locations of the points in the images. The surface of the object can then be represented using polygons with the vertices of each polygon having three-dimensional coordinates calculated from the positions of the vertices in the images.

To avoid the complexity and expense of camera or turntable systems that provide carefully measured camera orientations, efforts have been made to construct three-dimensional models based on series of unmeasured images, i.e., images where camera parameters such as the orientation and location of the camera relative to the object are unknown. A Wolfgang Niem and Jochen Wingbermühle, "*Automatic Reconstruction of 3D Objects Using a Mobile Monoscopic Camera*", Proceedings of the International Conference on Recent Advances in 3-D Digital Imaging and Modeling, IEEE (1997) describes a camera calibration technique using a known radially symmetric background pattern that is photographed with the object. With this technique, circles surrounding the object appear elliptical in the images, and the camera parameters can be determined from measurements of ellipse in the images. This technique can encounter difficulties in identifying thin lines corresponding to the circles in the background, particularly since the object generally blocks the view of a portion of the each surrounding circle. Additionally, calculations for such systems are best performed in radial coordinates, which can increase complexity and required processing power.

Other modeling techniques are known for images that do not contain a known background. For example, M. Pollefeys, R. Koch and L. Van Gool, "*Self-Calibration and Metric Reconstruction in spite of Varying and Unknown Internal Camera Parameters,*" International Journal of Computer Vision, 32(1), 7–25, 1999 provides methods for calibrating images for camera parameters without using a known pattern in the images. R. Koch, M. Pollefeys, L. Van Gool, "*Realistic surface reconstruction of 3D scenes from uncalibrated image sequences,*" Journal Visualization and Computer Animation, Vol. 11, pp. 115–127, 2000 and M. Pollefeys, R. Koch, M. Vergauwen, L. Van Gool, "*Automated reconstruction of 3D scenes from sequences of images,*" Isprs Journal Of Photogrammetry And Remote Sensing (55)4 (2000) pp. 251–267 describe methods for reconstruction of a three-dimensional model of a selected portion of architectural structure. An article entitled "*3D Model Acquisition from Extended Image Sequences*", Proc. 4th European Conference on Computer Vision, LNCS 1065, Cambridge, pages 687–695 (1996) by Paul Bradley, Phillip Torr, and Andrew Zisserman describe methods for constructing a three-dimensional model from extended image sequences such as from a camcorder.

The prior systems for generating 3D models from uncalibrated images have typically been limited in the angular portion of an object represented or have required a large amount of processing power to implement. Accordingly, ability to construct a full 3D model of an object has been out of reach for most users. Simpler and less expensive systems and methods for generating three-dimensional models and/or panoramic views are desired.

SUMMARY

In accordance with an aspect of the invention, a system or method for constructing a three-dimensional model and/or a panoramic view of an object does not require a complex mounting or measurement system for cameras. Instead, a user can take images without measuring or knowing the positions and orientations of the camera. Software implementing a reconstruction engine identifies features in the images and from the shapes sizes, and locations of the features in the images calibrates the images according to the perspective of the camera or cameras taking the images. The reconstruction engine thus can determine a three-dimensional model of the object in the images and can also perform image-based rendering, which generates desired views of the object from the three-dimensional model.

One embodiment of the invention uses a background having separated marks with known dimensions and positions. Photographs from several perspectives are taken of the object with the background being visible in each photographed image. The reconstruction engine uses the known dimensions of the marks in the background to calibrate the images for camera positions. Since the dimensions of the background pattern are known, the reconstruction engine can determine a transformation including a projection matrix for each image without reference to the other images and without measurement of a camera's position or orients ion. The information known about the pattern reduces the required processing power or time required to determine camera parameters for the images.

In one embodiment, each mark in the background pattern includes one or more rectangular segments with the rectangular segments having known proportions and relative positions in the pattern. For example, each mark can include two rectangular segments that when combined give the mark an L-shape. Each L-shaped mark provides six corner points having known 3D coordinates, and the known 3D coordinates and the measure coordinates of the corner points in an image indicate a transformation between the 3D coordinates and the image coordinates. The known background coloring and mark shapes simplify the process of distinguishing pixels in an image that correspond to the background from pixels that are part of a silhouette of the object. Additionally, the marks are positioned so that each image will generally include one or more marks that are separate from the object and therefore easier to identify and measure. Further, when rectangular segments are employed, determinations of projection matrices or transforms can be performed in Cartesian coordinates.

Volume generation techniques using the determined transforms and object silhouettes can construct a dense set of 3D points that define an approximation of the volume of the object. In particular, applying one or more determined transform to a dense set of points within a volume transforms 3D coordinates to 2D coordinates in an image or images corresponding to the one or more transforms. The set of 3D points that transform to points in the silhouette or silhouettes are sometimes referred to herein as the volume points because those points are within an approximation of the volume of the object.

A surface reconstruction process uses the volume points or a sparse sampling of the volume points to construct a polygon mesh representing the surface of the object. Surface reconstruction processes that are known for generating a surface from unorganized points can use the volume points, and information found in the volume generation process can reduce the processing power required for the surface reconstruction.

In accordance with another aspect of the invention, a texturing process adds texture or coloring from the images to the polygons (e.g., triangles) in the mesh. The texturing process constructs for each polygon an ordered list of images that are candidates for providing texture to the polygon. Generally, the list for a polygon ranks the candidate images according to the direction of the camera axis for the image relative to the direction of the vector normal to the surface of the polygon, and the list particularly identifies a best image and good images for providing texture to the polygon. Candidate images are eliminated from the list for a polygon if the projection of the polygon onto the image extends outside the object's silhouette in the image or if another part of the object at least partially obscures the view of the projection in the image.

To improve the consistency and appearance of the texture in the 3D model, contrast in the images can be adjusted to provide smooth transitions from each image to the images corresponding to adjacent views of the object. Additionally, the polygon mesh is partitioned into regions of contiguous polygons where all polygons in a region have the same image as the best source for texture. Any small regions can have theirs source image changed to that of a larger adjacent or surrounding region if the source image for the larger region is in all of the lists for the polygons in the smaller region.

To improve performance of texture mapping in a computer, images that are the best source of texture for only a small number of polygons can be replaced with other image as the source of texture. Eliminating such images reduces the number of images and the amount of memory storage required in a texture memory. Additionally, multiple images can be combined or blended to generate one or more texture image for storage and use in texture memory.

Another embodiment of the invention identifies features in the various images and matches the features found in one image with corresponding features found in other images. The changes in the corresponding features of the various images indicate the differences in perspectives for the camera or cameras taking the images. Accordingly, a reconstruction engine can perform camera calibration based on the appearance or locations of the matching features in multiple images. Once the camera positions are determined, the reconstruction engine can construct the three-dimensional model of the object.

One particular method for reconstruction uses fundamental matrices of two-view correspondences and trifocal tensors of three-view correspondences for projective reconstruction of a sparse 3D model. Additionally, a metric reconstruction based on the fundamental matrices and two-view correspondences can generate a dense 3D model. The metric reconstruction generally provides a 3D model with appearance that is superior to the appearance of the projective reconstruction, but metric reconstruction occasionally may fail for some sets of images. The combination of the projective reconstruction and the metric reconstruction provides a more robust 3D modeling engine since the projective reconstruction can be used when the metric reconstruction fails. Additionally, calculations required for the two reconstructions overlap so that the processing power requirements are not as large as required for two completely separate reconstructions.

A reconstruction engine, which may be implemented in software, can perform a reconstruction processes that use a background pattern and/or features of the images for reconstruction of a three-dimensional model of the object as described above.

BRIEF DESCRIPTION OF THE DRAWINGS

Use of the same reference symbols in different figures indicates similar or identical items.

DETAILED DESCRIPTION

In accordance with an aspect of the invention, a reconstruction engine generates a full three-dimensional model and/or a panoramic view of an object without requiring a complicated system for taking pictures from measured locations relative to the object. Instead, the reconstruction engine can use images of the object taken from almost any set of viewpoints relative to the object. Based on the content of the images, the reconstruction engine calibrates each image for camera orientation and location and does not require measurements of the orientation or location.

One calibration technique uses images of the object on a known background pattern. The background pattern contains marks with known dimensions that allow the reconstruction engine to determine the camera parameters for the images. An alternative calibration technique identifies and matches features in the images and determines camera parameters from differences in the appearance of matching features in different images.

Figure 1:
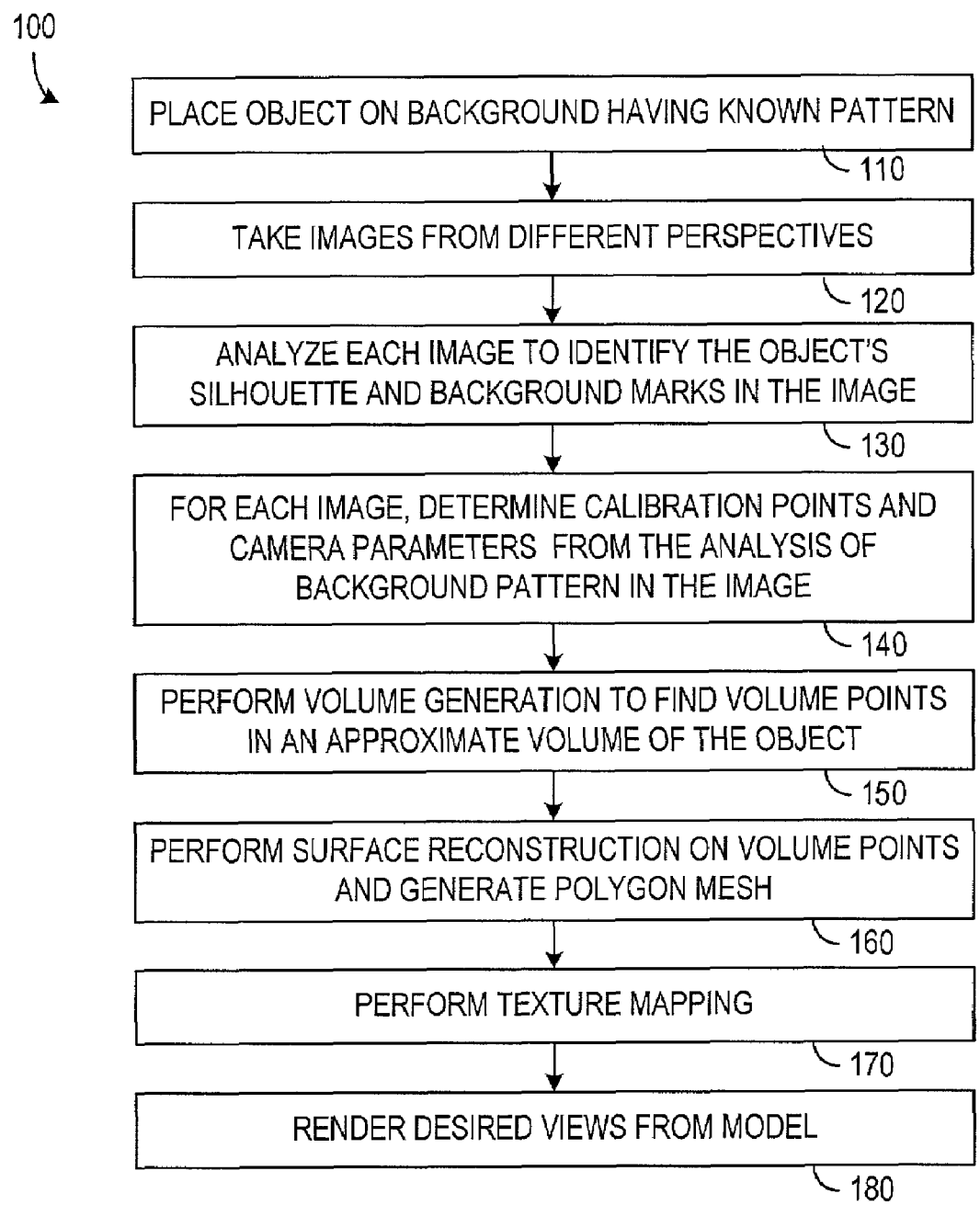
FIG. 1 is a flow diagram of a process using images containing a known background for generation of a three-dimensional model in accordance with an embodiment of the invention.

FIG. 1 illustrates a process 100 for constructing a three-dimensional model of an object using images containing a known background pattern. Process 100 begins with a step 110 of placing an object on, in front of, or near a background so that the background appears in images taken of the object. The background has a known pattern can be a printed sheet containing several separated marks having identifiable points such as corners. A person seeking to generate a three-dimensional model of an object can easily create such a background using a printer and with a color printer, can select the coloring of the background according to the coloring of the object as described further below.

Figure 2A:
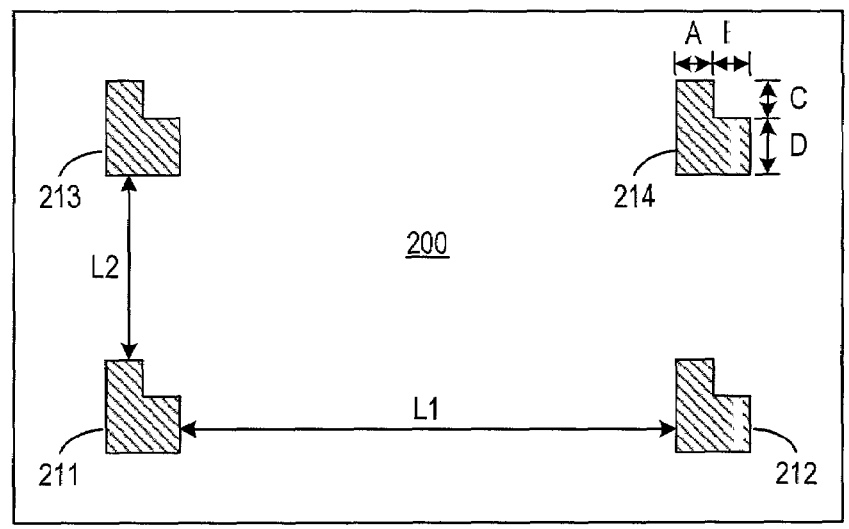
FIGS. 2A and 2B illustrate alternative backgrounds for use in the process of FIG. 1.
Figure 2B:
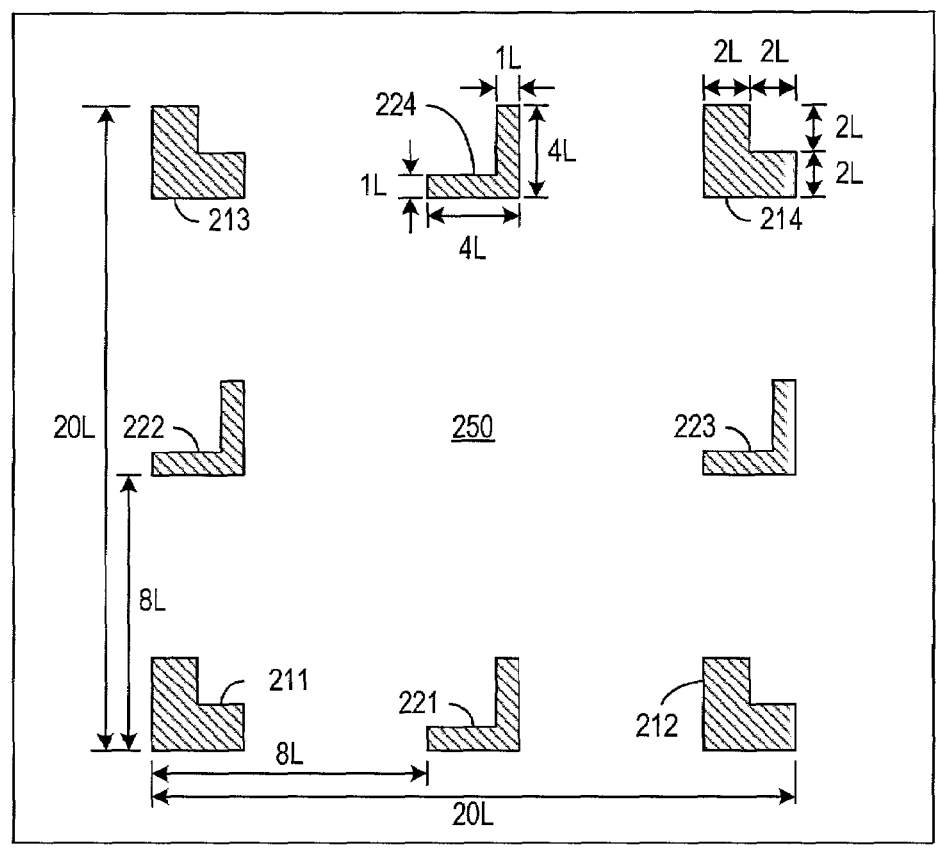
Figure 3A:
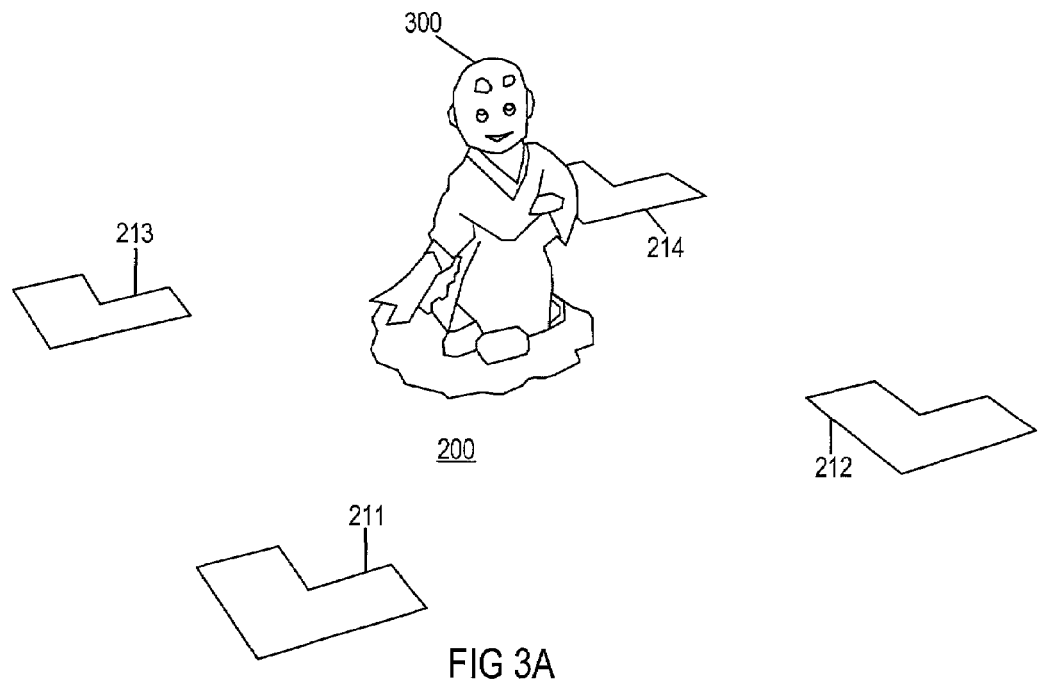
FIGS. 3A, 3B, 3C, and 3D represent images taken from different perspectives of an object on a background.
Figure 3B:
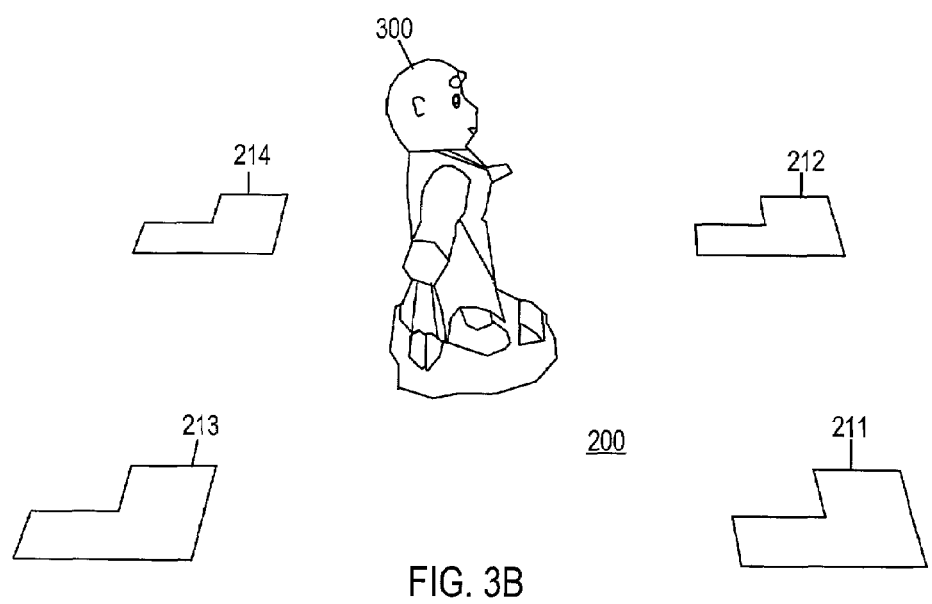
Figure 3C:
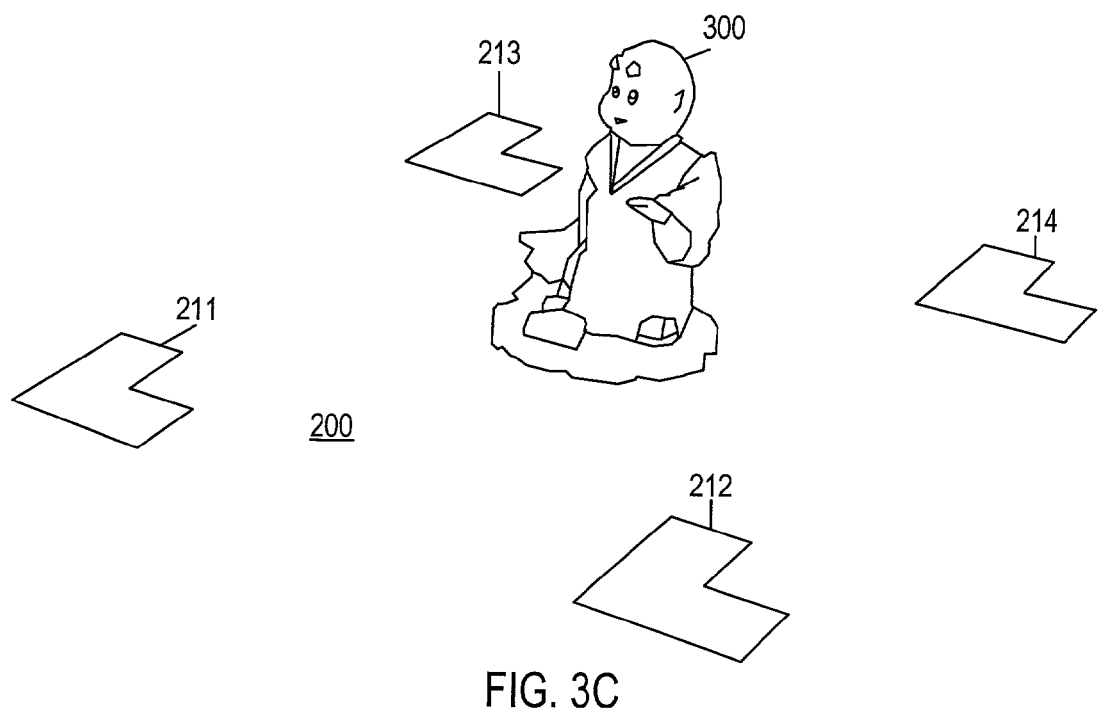
Figure 3D:
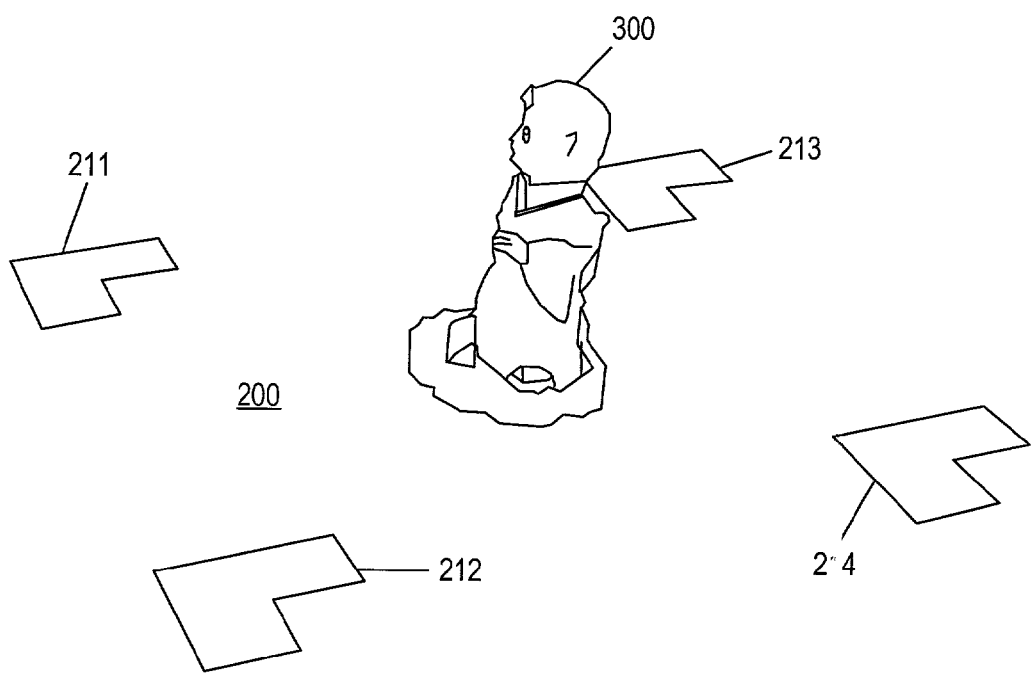

FIGS. 2A and 2B illustrate exemplary backgrounds 200 and 250 having patterns with known geometry. In the illustrated embodiments, backgrounds 200 and 250 include a field having a field color and marks having a pattern color. The field color preferably differs from the coloring of the object and has a hue that simplifies identification of the object's shadow. Marks on the field color preferable have a pattern color such as black, which provides a high contrast from the field color and the object's color. The size of the background 200 or 250 is preferably selected according to the size of the object so that the object when placed in the center of the background 200 or 250 does not cover any of the marks and so that each image will preferably contain at least three of the marks that are fully visible.

Background 200 has four marks 211 to 214. A distance L1 along a first axis separates mark 211 from mark 212 (and mark 213 from 214), and a distance L2 along a second axis separates mark 211 from mark 213 (and mark 212 from mark 214). Each of marks 211 to 214 is L-shaped and consists of two rectangular segments having known dimensions A, B, C, and D. The asymmetry of each mark and the orientations of the marks as in background 200 simplify identification of a reference axis for the image. Additionally, the use of rectangular segments simplifies identification of the marks and is convenient for expressing transforms in Cartesian coordinates. The L-shape marks 211 to 212 provide several corners that software can easily locate and distinguish in images. As described further below, the known three-dimensional coordinates of the corner points and the measured two-dimensional coordinates of the corner points in an image can be plugged into formulae that provide the projection matrix (or inverse of the projection matrix) for the image.

Background 250 has eight marks 211 to 214 and 221 to 224, which are also L-shaped. As a specific configuration for background 250, marks 211 to 214 and mark; 221 to 224 are equally spaced at the perimeter of a 20L-by-20L square, where L can be any desired unit of length. Each mark 211 to 214 is 4L×4L in size with rectangular segments having width 2L, and each mark 221 to 224 is 4L×4L in size with rectangular segments having width L. With eight marks, background 250 provides more corners that will be visible in the images (i.e., not obscured by the object). Additionally, in each image, multiple marks will generally be separated from the silhouette of the object and therefore easily identified. Background 250 therefore provides for a robust determination of the projection matrices or transforms or the images.

Pattern 200 and 250 of FIGS. 2A and 2B are merely examples of suitable patterns for reconstruction of three-dimensional models. More generally, such patterns have unlimited possible variations of sizes, colors, and the shapes and separation of marks. For example, the L-shaped marks in the patterns can be replace with square or rectangular marks or marks having any separated shapes that provides recognizable points such as corners in an image. The spacing of the marks can be symmetric or asymmetric.

With the object on the background, a user in step 120 (FIG. 1) takes several pictures of the object and background using different camera angles. Taking the pictures does not require any special equipment for positioning of cameras or measuring the position of a camera when taking the picture. One camera can sequentially take all of the pictures. The camera can be a handheld analog or digital camera, but generally, the processing techniques described herein are easiest for processing of digital image data. Ideally, each image will include just the object and the background with at least three marks being fully visible. The images are preferably taken without using a flash that can cause the images to differ lighting and shadows.

FIGS. 3A, 3B, 3C, and 3D illustrate four of the images of an object 300 and background 200 from different camera locations. When taking the images, the camera can have any positions relative to the object, provided that the images collectively provide a diverse set of views of the object. Generally, eight or more images from points distributed around the object are sufficient, but more (e.g. up to 30) images may provide a more accurate three-dimensional model of the object. More images are preferred for objects with complicated shapes. Accordingly, three-dimensional reconstruction does not require the large number of images or a correspondingly powerful processing system that some other three-dimensional reconstruction processes require.

Once the images are taken (and digitized if necessary), the reconstruction engine processes digital image data to construct a three-dimensional model that the reconstruction engine can use when rendering views of the object. The reconstruction engine is generally implemented in software that can be executed on a conventional personal computer with a clock speed of about 500 MHz or more.

In process 100 of FIG. 1, image processing begins in step 130 with image analysis that extracts from each image the silhouette of the object, the separated mark regions, and the locations of reference points associated with the mark regions. For silhouette extraction, the reconstruction engine examines each pixel in each image to determine whether the pixel represents part of the object, part of the background pattern, or part of the background field. Generally, the colors may vary somewhat in different images because of differences in lighting and/or differences in cameras used for the different images. Additionally, a shadow of the object may lie on a portion of the background in an image.

A histogram can typically identify the colors corresponding to the field and pattern colors in the background. In particular, a histogram of the colors in an image will have peaks corresponding to the nearly uniform field and pattern colors. The field and pattern colors can also be identified or distinguished as corresponding to peaks near the expected field and pattern colors, from the location of the color near the edges of the image, and from uniformly colored shapes having proportions consistent with the known shapes and relative locations of marks in the pattern.

The silhouette of the object in an image includes the portion of the image that does not match the field or pattern color of the background. Accordingly, a background having field and pattern colors that differ from the coloring of the object may provide the best results for silhouette extraction. However, portions of the object that match the field or pattern color of the background can be identified from the known shape of the pattern, and additional image processing of multiple images can help distinguish points of the object that happen to have the field or pattern color.

Figure 4:
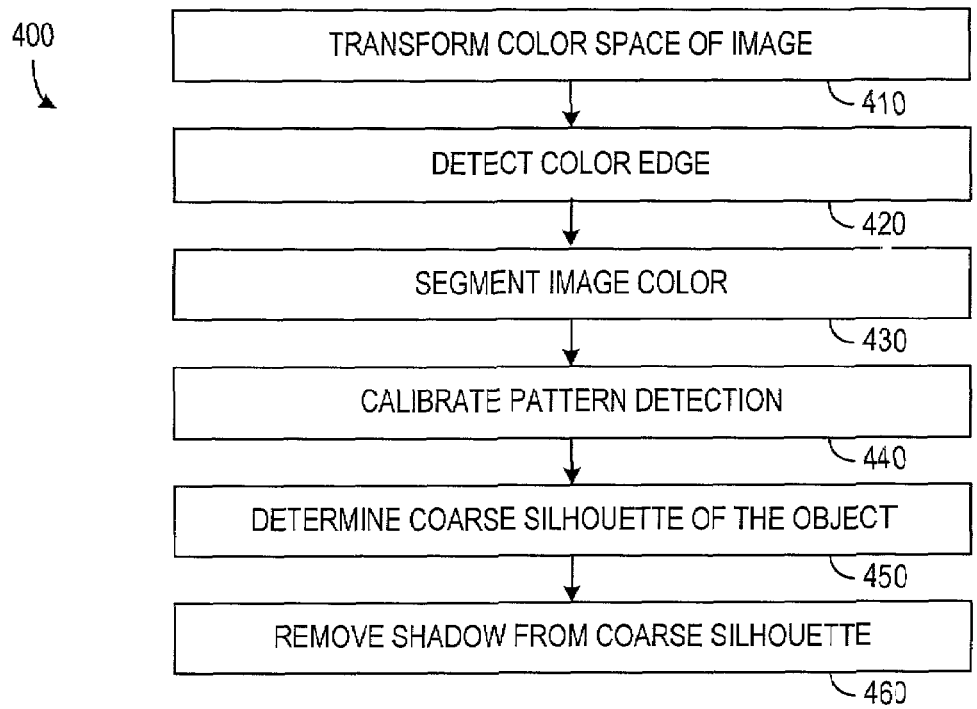
FIG. 4 is a flow diagram of a silhouette extraction process in accordance with an embodiment of the invention.

FIG. 4 is a flow diagram of a silhouette extraction process 400 in accordance with an embodiment of the invention. Silhouette extraction process 400 operates or an image represented by a pixel map with each pixel in the image having corresponding Red-Green-Blue (RGB) values that indicate the color of the pixel. To simplify shadow detection and adjustments for differences in lighting or contrast, step 410 of process 400 transforms the RGB values of the pixel map to HSV space and determines a hue for each pixel. Equations 1 indicate a standard transformation from RGB space to HSV space and a hue value HUE for a pixel having RGB values R, G, and B.

$I1 = (R+G+B)/3$ $I2 = \log R - \log$ $I3 = \frac{1}{2} \log RG - \log B$     Equations 1:

$$HUE = \arctan\left(\frac{\sqrt{3}(G-B)}{2R-G-B}\right)$$

Step 420 detects color edges in the image. In one embodiment, step 420 performs a Gaussian smoothing operation on the RGB pixel map and then calculates the gradient of the color values I2 and I3 found from the smoothed pixel map. Equations 2 indicates the values of gradients G0, G45, G90, and G135 of color value I (I=I2 or I3) along respective directions 0°, 45°, 90°, and 135° through a pixel having coordinates x and y in the pixel map.

Equations 2:

$G0(x, y) = I(x-1, y+1) + 2I(x, y-1) +$
$\qquad I(x+1, y+1) - I(x-1, y-1) - 2I(x, y-1) - I(x+1, y-1)$
$G90(x, y) = I(x+1, y-1) + 2I(x+1, y) + I(x+1, y+1) -$
$\qquad I(x-1, y-1) - 2I(x-1, y) - I(x-1, y+1)$
$G45(x, y) = I(x+1, y) + 2I(x+1, y+1) + I(x, y+1) -$
$\qquad I(x-1, y) - 2I(x-1, y-1) - I(x, y-1)$
$G135(x, y) = I(x+1, y) + 2I(x+, y-1) + I(x, y-1) -$
$\qquad I(x-1, y) - 2I(x-1, y+1) - I(x, y-1)$ Different materials in the image generally cause a change in color values I2 and I3 so that a color edge corresponding to a local maximum in the gradient image often marks an edge between different materials. Both the color edge of RGB values and the edge of color values I2 and I3 indicate initial edges for the object and the marks in the pattern.

After determination of initial color edges in the image, step 430, segments the image into regions by color. Segmentation can be performed in three steps. A histogram-based segmentation to segment each image into several regions with each region containing pixels that fall into the same color bin. Each region is divided into separate regions if the color gradients indicated an edge within the region, and connected regions that are separate bins but have similar colors are merged together.

Step 440 detects pattern marks by identifying regions having a color, surroundings, and a shape consistent with the known pattern. In particular, dark regions are candidate regions for marks when the pattern color is black. The shape of the candidate region is compared to the pattern via a re-projection method, which projects the pattern onto the image plane and then compares the positions of the projected vertices with those detected for the candidate region.

Step 450 determines a coarse silhouette for the object by first removing the confirmed mark regions of the pattern and regions having the field color. The remaining regions may contain the object, shadow, and pattern mark regions connected to the object. Step 450 further uses the detected mark regions to identify and remove the unidentified mark regions that may be connected to the objects silhouette.

Step 460 removes the shadow of the object from the remaining region. The shadow generally contains a portion of the background having less lighting. If the shadow is not too dark, the hue of a shadow region will be the same as the hue of the background. Accordingly, regions having the same hue as the background are removed from the silhouette of the object. For darker regions, color values I2 and I3 are used to distinguish the shadow from the object's silhouette. After removing the shadow, the remaining region is the silhouette of the object in the image.

Returning to FIG. 1, a result of identifying the object's silhouettes in step 130 (and process 400) is identification of a bit map that indicates whether each pixel in part of the object (i.e., part of the silhouette) or part of the background. Process step 130 also identifies regions corresponding to marks in the background pattern and determines the image coordinates X and Y (e.g., column and row coordinates in the pixel map) of corners or other distinctive calibration points of the marks. Optionally, the silhouette for an image and the regions identified as the marks in the background can be overlaid on the image presented to a user for possible modification. With this option, the user improves the silhouette or mark region if the automated analysis erred.

Given the silhouettes of the object and the image coordinates of the calibration points in the images, step 140 determines the camera parameters of the images. In particular, for each image, a camera calibration process determines a projection matrix R and a translation vector T for the image. The projection matrix R and a translation vector T are parts of a transform from three-dimensional world coordinates (xw, yw, zw) to 3-dimensional camera coordinates (x, y, z) as defined in Equation 3.

Equation 3:
$$\begin{pmatrix} x \\ y \\ z \end{pmatrix} = R \cdot \begin{pmatrix} xw \\ yw \\ zw \end{pmatrix} + T = \begin{pmatrix} r1 & r2 & r3 \\ r4 & r5 & r6 \\ r7 & r8 & r9 \end{pmatrix} \cdot \begin{pmatrix} xw \\ yw \\ zw \end{pmatrix} + \begin{pmatrix} Tx \\ Ty \\ Tz \end{pmatrix}$$

The camera coordinates (x, y, z) have a z-axis along the optical axis of the camera, so that Equations 4 give the image coordinates X and Y in terms of the camera coordinates and the effective focal length f of the camera.

Equations 4:
$$X = f \cdot \frac{x}{z}$$
$$Y = f \cdot \frac{y}{z}$$

Using a world coordinate system having the background in the plane of the xw and yw axes (i.e., zw=0 for all points in the background), coordinates xw and yw are known for each calibration point (e.g., corner point) in the background. The image coordinates X and Y for calibration points are known from step 130. From Equations 3 and 4, it can be shown that components of projection matrix R and translation vector T satisfy Equation 5 for each calibration point.

Equation 5:
$$(xw \cdot Y \quad yw \cdot Y \quad -xw \cdot X \quad -yw \cdot Y) \cdot \begin{pmatrix} r1/Ty \\ r2/Ty \\ Tx/Ty \\ r4/Ty \\ r5/Ty \end{pmatrix} = X$$

Accordingly, a set of more than five calibration points identified in an image provides an overdetermined system of Equations (i.e., Equation 5 repeated for each identified calibration point). Each separate L-shaped mark in the pattern of FIG. 2A or 2B provides six calibration points and therefore six equations. Step 140 solves system of equations using conventional methods to determine values r1', r2', r4', r5', and Tx' of Equations 6.

Equations 6:
$$r1'=r1/Ty; \; r2'=r2/Ty; \; r4'=r4/Ty; \; r5'=r5/Ty; \; Tx'=Tx/Ty;$$

Projection matrix R being an orthonormal matrix implies that translation component Ty is given in Equations 7 and projection matrix R is given in Equation 8. In Equation 8, r1, r2, r4, and r4 can be determined from Equations 6 and 7, S is -sign(r1r4+r2r5), and components r7, r8, and r9 can be determined from the outer product of the first two rows of he projection matrix.

Equations 7:
$$Ty^2 = \frac{Sr - [Sr^2 - 4(r1' \cdot r5' - r4' \cdot r2')]^{1/2}}{2(r1' \cdot r5' - r4' \cdot r2')};$$
$$Sr = r1'^2 + r2'^2 \cdot r4'^2 + r5'^2$$

Equation 8:
$$R = \begin{pmatrix} r1 & r2 & \sqrt{1-r1^2-r2^2} \\ r4 & r5 & S\sqrt{1-r4^2-r5^2} \\ r7 & r8 & r9 \end{pmatrix} \quad \text{if} \; f > 0$$

$$R = \begin{pmatrix} r1 & r2 & -\sqrt{1-r1^2-r2^2} \\ r4 & r5 & -S\sqrt{1-r4^2-r5^2} \\ -r7 & r8 & r9 \end{pmatrix} \quad \text{if} \; f < 0$$

The effective focal length of the camera taking the image and the z component Tz of the translation vector T can be determined by solving a system of equations found by inserting the known image coordinate Y and world coordinates xw and yw for multiple calibration points into Equation 9.

Equation 9:
$$(r4 \cdot xw + r5 \cdot yw + Ty - Y)\begin{pmatrix} f \\ Tz \end{pmatrix} = Y \cdot (r7 \cdot xw + r8 \cdot yw)$$

Step 140 using the above-described techniques can determine for each image a transform from three-dimensional world coordinates xw, yw, and zw to image coordinates X and Y. Step 150 uses the transform and object silhouette for one or more of the mages to generate a dense set of points within an approximation of the object's volume. Volume generation in step 150 starts with one of the images and a candidate volume, e.g., a volume containing points having world coordinates xw, yw, and zw such that $0 \leq xw \leq xwmax$, $0 \leq yw \leq ywmax$, and $0 \leq zw \leq zwmax$. The marks in the background can define boundaries xwmax and ywmax of the candidate volume, and the boundary zwmax can be user selected or set according to xwmax and ywmax.

Volume generation step 150 applies the transformation found for an image to a dense set of candidate points in the candidate volume for the image. Every point that the transform maps onto the silhouette for the object is considered a point in an approximate volume of the object. Optionally, the approximate volume thus found can be used as a candidate volume for another of the images to further refine the approximation of the volume of the object. The process can be repeated until step 150 finds the volume points in suitable refined approximate volume.

Figure 5:
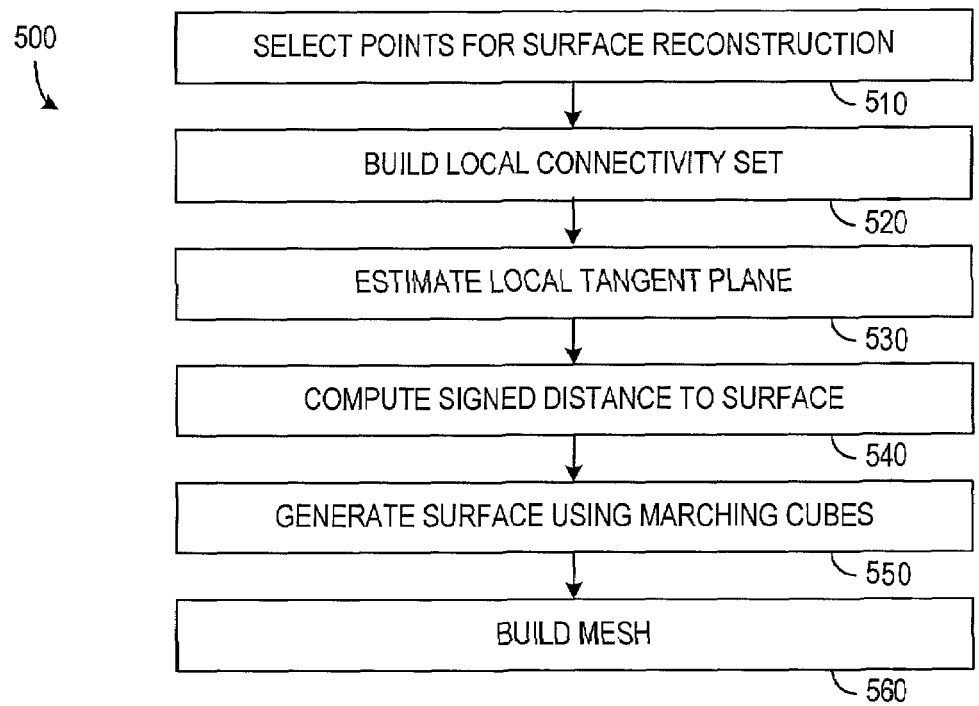
FIG. 5 is a flow diagram of a surface reconstruction process in accordance with an embodiment of the invention.

Step 160 constructs a three-dimensional model of the surface of the object using the volume points from step 150 and a reconstruction process such as process 500 of FIG. 5. In process 500, an initial step 510 selects a set of volume points for surface reconstruction. As noted above, step 150 finds a dense set of the volume points, e.g., with volume points approximately as dense as pixels in the images. An exemplary embodiment of the invention reduces required processing power by selecting a subset of the volume points by sampling the volume points to generate a subset of volume points distributed uniformly throughout the object surface.

Steps 520, 530, and 540 identify the surface of the object and can use known techniques unorganized points such as described in "Surface Reconstruction from Unorganized Points", Hoppe et al., Siggraph 92' Proceedings, page 71–78, which is hereby incorporated by reference in its entirety. In particular, step 520 partitions the selected volume points for construction of a local connectivity graph. Identifying closest neighboring points generally requires calculation of the distances between points, but this brute force method requires a large amount of processing power. Accordingly, the volume points are hashed into different buckets based on their three-dimensional coordinates. In particular, points in the same cube are in the same bucket. Smaller cubes can be used to reduce the number of candidate points that need to be considered when identifying the closest neighboring points, but more buckets may need to be search to find a desired number of points.

Once local neighborhood of the specified points are known, set 530 identifies an approximate tangent plane for each of the surface points. A determination of the tangent plane for a point can include calculating the centroid of the neighboring points and the covariance matrix. The Jacobi method can determine the eigenvector of the covariance matrix to get an estimated normal to the surface at the point.

Step 540 samples three-dimensional space with evenly distributed sample points and determines the distance of these points to the surface defined by the tangent planes found in step 530. The spacing of the sample points determines the granularity or size of surface triangles in the reconstructed three-dimensional model. To determine the distance for a sample point A, the volume point A' closest to the sample point A is identified and a distance is computed from a dot product to the normal vector at volume point A'. The sign of the distance, which is negative for points inside the volume and positive for points outside the volume, can be determined using a minimum spanning tree and cost function as Hoppe et al. describe. Alternatively, determining whether a point is one of a volume points from the volume generation (step 550 in FIG. 1) indicates the sign and requires less processing power. Calculation of some of the signed distances can be avoided to further reduce required processing power requirements. In particular, the marching cubes technique only requires accurate distances for points near the surface of the object, and points far from the surface can be given a sign and an arbitrary distance.

Step 550 uses a marching cubes technique to reconstruct the surface of the object. Step 560 then constructs a mesh of polygons (e.g., triangles) that correspond to portions of the surface of the object. Marching cubes techniques for construction of polygon meshes are known in the art and described, for example, by Schroeder et al., "The Visualization Toolkit", 2$^{nd}$ Edition, Prentice Hall © 1998, which is hereby incorporated by reference in its entirety.

To permit a users input to the surface reconstruction, the 3D reconstruction engine can provide a rendering of the polygon mesh and permit a user to view and modify the polygon mesh. The user can for exampled change the location of vertices and add or remove polygons to improve the accuracy or appearance of the polygon mesh. In a similar fashion, the user can edit the results of silhouette extraction and/or edit the results of texture mapping. Further, if at any point the user is not satisfied with the appearance of the reconstruction, the user can add another image for the analysis. The object's silhouette and the locations of the calibration points in the added image can be determined as indicated above (steps 130 and 140), and the transform determined from the calibration points can be applied to volume points in the approximate volume of the object to further refine the approximate volume as described for step 150 of process 100. Accordingly, a user can incrementally refine the 3D polygonal model by adding pictures until the user is satisfied with the result.

Returning to FIG. 1, a step 170 performs texture mapping of the polygons in the mesh from step 160. Texture mapping 170 assigns colors or textures to the polygons according to the color or texture of the object as shown in the images.

Figure 6:
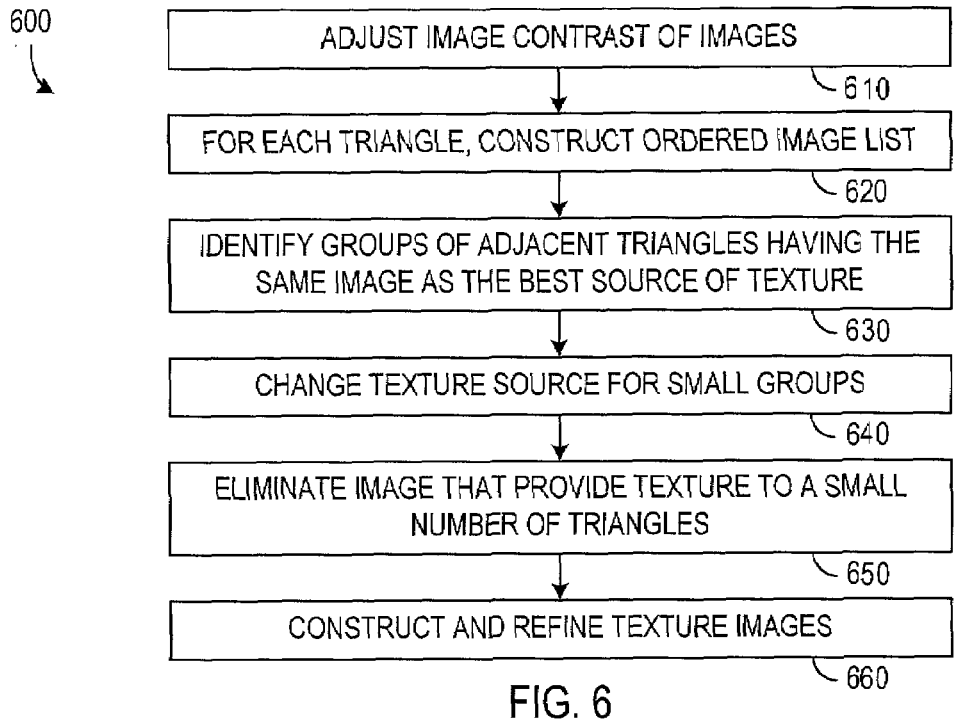
FIG. 6 is a flow diagram of a texture mapping process in accordance with an embodiment of the invention.

FIG. 6 is a flow diagram of a texture mapping process in accordance with an embodiment of the invention. Texture mapping process 600 includes a contrast adjustment step 610 that adjusts color values associated with pixels in the images. In particular, contrast adjustment step 610 compares the contrast in images having adjacent perspectives, i.e., camera positions closest to each other and adjusts the color values to smooth the contrast change from one image to the next. Contrast adjustment 610 can compensate for some of the differences in the images that differences in lighting may have caused.

For each triangle in a mesh representing the surface of the objects step 620 constructs an image list for the triangle. Ideally, the image list for a triangle contains the images that could provide the texture for the triangle, and the images in the list are ranked from the best source of texture to the worst. One technique for constructing the image list begins by ordering the images according to the angle between the camera's axis as determined during camera calibration and the direction of the normal vector of the triangle. In particular, candidate images that are initially in the list for a triangle have a rank according to how parallel the optical axis of the camera that took the image is to an inward normal of the triangle under consideration. An image is removed from the list for a triangle if a projection of the triangle into the image has a portion outside the object's silhouette in the image. Further, to solve the problem of a triangle that is partially or fully obscured or blocked in a particular image, the image is removed from the triangle's list if the projection of the triangle into the image overlaps the projection of any triangle that is closer to the camera.

In an alternative method for ranking images as sources of textures the 3D reconstruction engine allows a user to view texture that the images provide for each triangle, and for each triangle, the user can rank the images according to the subjectively-judged appearance of the different textures for the triangle.

Once a list of candidate images has been identified for each triangle, step 630 separates the triangles into groups of adjacent triangles, where each triangle on a group has the same image as the best source for texture. Step 640 then examines the groups to identify a small group of connected triangles that are surrounded by a larger group of triangles. Step 640 switches the image that is initially the source of texture for the small group of triangles to the same image that is the source of texture for triangles in the surrounding group if the source image for the surrounding group is in each of the image lists for the triangles in the smaller group. This change in texture source reduces artifacts the might appear in rendered images at the boundaries between triangles having different images as source for texture.

Texture mapping processes for rendering an image from a three-dimensional model are well known in the art and commonly implemented in a 3D software package (e.g., OpenGL) and a video card that implements or supports the software package. Using a large number of images for texture requires a large texture memory and generally slows down the rendering process. To improve performance, step 650 removes any image that is a texture source for just a few triangles and uses other images from the image lists as the texture sources for those triangles. The removal of any of the images in step 650 reduces the required amount of texture memory and correspondingly improves performance during rendering of images.

Step 660 further improves texturing performance by constructing one or more texture images. Step 660 uses multiple images in the construction of a texture image. The construction process of step 660 identifies regions in the multiple images that actually provide texture for triangles in the three-dimensional model. Step 660 maps those regions (e.g. triangles) in the source images mapped to regions in the texture image. A smoothing or refining process for the texture image blends colors from images at boundaries in the texture image corresponding to different images. The blending reduces artifacts that could otherwise result at the boundaries between triangles. One texture image replaces multiple original images, thereby reducing the required amount of texture memory.

Once each triangle has an assigned image (or texture image), known rendering techniques maps the coloring from the assigned image to the triangle. The reconstruction engine can thus use the three-dimensional model of the object with the determined textures to generate any desired views of the object or to generate a series of views that form a panorama of the object. As described above, if the user is not satisfied with the end result, the 3D reconstruction engine can allow the user to modify the 3D model or allow the user to add another image of the object for analysis in generating a refined 3D model.

The reconstructed 3D model can be exported for use in other software. In particular, the 3D model can be converted to Arcsoft 3D file format or any available format for 3D models. Additionally, the 3D reconstruction engine or the format conversion process can modify the complexity of the 3D model (e.g., the number of geometric primitives such as triangle, edge, vertex, etc.) to meet the quality or rendering speed requirements of a particular user or software package.

Figure 7:
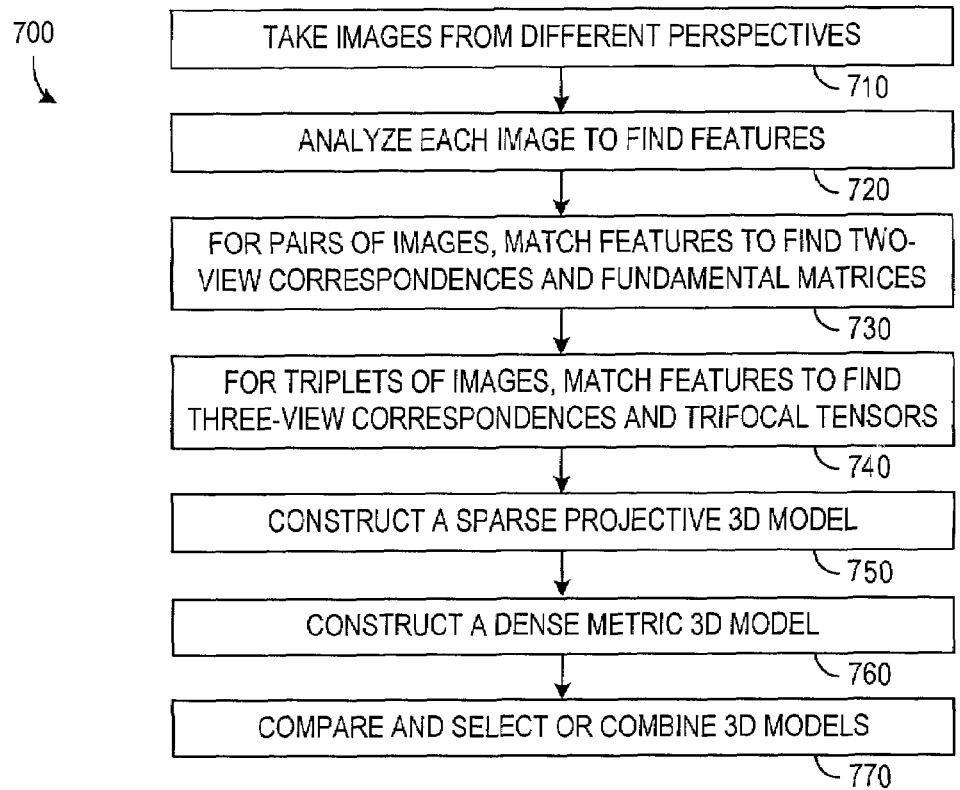
FIG. 7 is a flow diagram of a process using images for generation of a three-dimensional model in accordance with an embodiment of the invention.

FIG. 7 is a flow diagram of a panorama construction process 700 in accordance with another embodiment of the invention. Process 700 begins with a step 710 of taking several (e.g., 8 to 12) images of an object from different perspectives. Unlike process 100 described above, no special background is in the images, and process 700 performs camera calibration based on features of the object in the images.

Step 720, analyzes each image to identify features of the object such as corners. Step 730 then considers pairs of the images and for each pair matches the identified features in the two images. In particular, step 730 recursively determines a fundamental matrix that maps the features of one image in the pair of images to the features of the other image in the pair. Each iteration of the recursive operation adjusts the coefficients of the fundamental matrix to improve the number of correspondences of the features in the two images.

Step 740 considers triplets of images and compares the features in three images. The technique recursively determines a trifocal tensor for associating features of one image with matching corresponding in the other two images.

Step 750 reconstructs a projective three-dimensional model of the object using the fundamental matrices and the trifocal tensors. Paul Beardsley, Phil Torr, and Andrew Zisserman, "3*D Model Acquisition from Extended Image Sequences*", Proc. 4$^{th}$ European Conference on Computer Vision, LNCS 1065, Cambridge, pages 687–695 (1996) and R. Hartley and A. Zisserman, "*Multiple View Geometry*" describe suitable techniques for generating a projective three-dimensional model as in step 750 and are hereby incorporated by reference in their entirety.

Projective three-dimensional models are subject to distortion of the shape of the object. Accordingly, step 760 constructs a metric three-dimensional model that in many cases provides a more accurate representation of the surface of an object Pollefeys et al., "*Self Calibration and Metric Reconstruction in Spite of Varying and Unknown Intrinsic Camera Parameters*", International Journal of Computer Vision, (1998) and M. Pollefeys, "*SIGGRAPH* 2001— *Course Notes obtaining* 3*D Models with a Hand-held Camera*" describe suitable techniques for generating a metric reconstruction of the surface of an object and are hereby incorporated by reference in their entirety.

In accordance with an aspect of the invention, process 700 in step 770 compares the projective and metric three-dimensional models of the object and selects or constructs a three-dimensional model for use. The metric three-dimensional model generally provides a more accurate model of the objects surface and is selected in step 770. However, for some sets of images, metric reconstruction fails to provide reasonable results, and step 770 selects the projective three-dimensional model. This capability makes process 700 more robust in determining three-dimensional models of objects.

Texture can be added to the mesh of polygons that process 700 constructs. In particular, texture mapping process 600 of FIG. 6 can provide texture to the three-dimensional model found in step 770.

Figure 8:
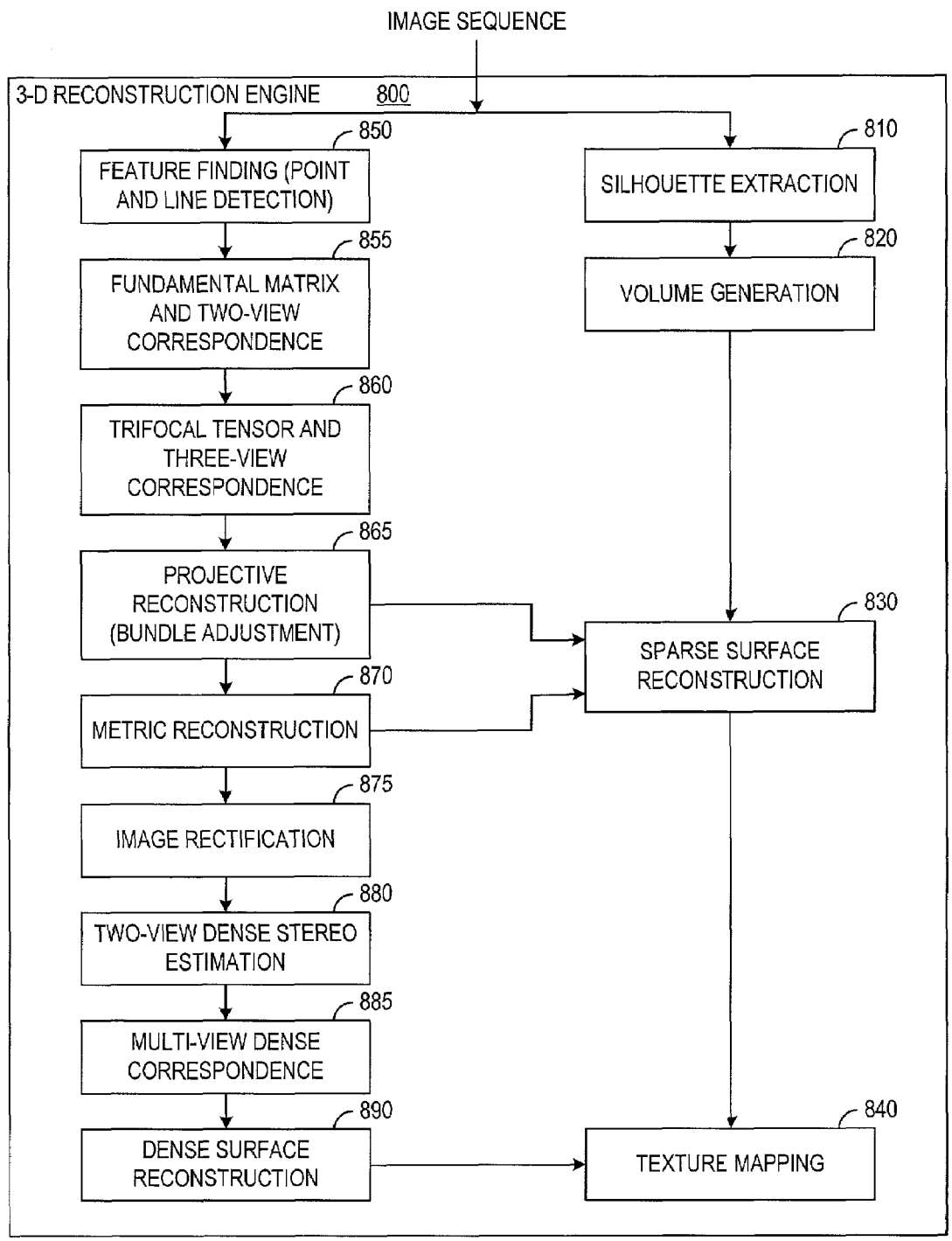
FIG. 8 is a block diagram of a reconstruction engine in accordance with an embodiment of the invention.

FIG. 8 illustrates a reconstruction engine 800 in accordance with an embodiment of the invention. Reconstruction engine 800, which would typically be implement in software executed by a general-purpose computer, includes software procedures or units that implement alternative data paths for the three-dimensional reconstruction processes 100 and 700 of FIGS. 1 and 7. In particular, reconstruction engine 800 includes a silhouette extraction unit 810, a volume generation unit 820, a sparse surface reconstruction unit 830, and a texture mapping unit 840 used to perform steps 130, 150, 160, and 170 in the three-dimensional reconstruction process 100 of FIG. 1.

Sparse surface reconstruction unit 830 and a texture mapping units 840 are used with a feature finding unit 850, a fundamental matrix and two-view unit 855, a trifocal tensor and three-view correspondence unit 860, a projective reconstruction unit 865, a metric reconstruction unit 870, an image rectification unit 875, a two view dense stereo estimation unit 880, a multi-view dense correspondence unit 885, and a dense surface reconstruction unit 890 on implementing the reconstruction process 700 of FIG. 7.

Reconstruction engine 800 initially sends an input series of images of an object to silhouette extraction unit 810 or feature finding unit 850 depending of the process selected for construction of a three-dimensional model of the object. In some cases, both processes can be used on the same set of images, and the resulting three-dimensional models of the object can be compared or combined to improve the accuracy of the three-dimensional model.

The computer program listing appendix includes a source code description of portions of reconstruction engine 800. In particular, files Segment.h and Segment.cpp illustrate techniques used in an embodiment of a silhouette extraction process. Files VolumeWp.h and VolumeWP.cpp illustrate techniques used in an embodiment of a volume generation process. Files BasicDef.h, Camera.h, Camera.cpp, TexImage.h, TexImage.cpp, TexMap.h, TexMap.cpp, TexMesh.h, TexMesh.cpp illustrate techniques for an embodiment of 3D polygonal model construction and texture mapping.

Although the invention has been described with reference to particular embodiments, the description is only an example of the invention's application and should not be taken as a limitation. For example, although the above description describes imaging of an object, the term object is not intended to exclude subjects such as people or animals, which could also be the object of images and image processing described above. Various other adaptations and combinations of features of the embodiments disclosed are within the scope of the invention as defined by the following claims.

What is claimed is:

1. An image processing method comprising:
   (a) analyzing a set of images containing an object and a background to identify for each image a silhouette of an object and locations in the image of pattern points in the background;
   (b) for each image, using the locations of the pattern points to determine a transform from three-dimensional coordinates to two-dimensional coordinates in the image;
   (c) transforming three-dimensional coordinates of a set of points in a candidate volume to the two-dimensional coordinates of a first of the images;
   (d) identifying an approximate volume of the object as containing the points that the transform maps onto the silhouette of the object in the first of the images;
   (e) setting a current candidate volume equal to the approximate volume;
   (f) transforming three-dimensional coordinates of a set of points in the current candidate volume to the two-dimensional coordinates in a next of the images; and
   (g) identifying the approximate volume of the object as a minimal volume containing the points that transform onto the silhouette of the object in the next of the images.

2. The method of claim 1, further comprising repeating the steps (e), (f), and (g) of claim 1 one or more times.

3. The method of claim 1, further comprising using the points in the approximate volume to construct a mesh of polygons that collectively approximate the surface of the object.

4. The method of claim 3, further comprising mapping a texture from the images to the polygons.

\* \* \* \* \*